(12) United States Patent
Kishino et al.

(10) Patent No.: US 9,034,474 B2
(45) Date of Patent: May 19, 2015

(54) FIXING BELT AND FIXING DEVICE

(75) Inventors: Kazuo Kishino, Yokohama (JP);
Katsuhisa Matsunaka, Inagi (JP);
Hiroto Sugimoto, Toride (JP);
Hidekazu Maruta, Abiko (JP);
Nobuyuki Kume, Abiko (JP); Keigo Kaji, Abiko (JP); Ko Nakano, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 649 days.

(21) Appl. No.: 12/843,636

(22) Filed: Jul. 26, 2010

(65) Prior Publication Data

US 2011/0045310 A1 Feb. 24, 2011

(30) Foreign Application Priority Data

Jul. 29, 2009 (WO) .................. PCT/JP2009/063512

(51) Int. Cl.
*G03G 15/20* (2006.01)
*C08G 73/10* (2006.01)
*C08L 79/08* (2006.01)

(52) U.S. Cl.
CPC ........ *G03G 15/2057* (2013.01); *C08G 73/1042* (2013.01); *C08G 73/105* (2013.01); *C08G 73/1071* (2013.01); *C08L 79/08* (2013.01); *G03G 2215/2016* (2013.01)

(58) Field of Classification Search
CPC ................. G03G 15/2057; G03G 2215/2016; G08G 73/1042; G08G 73/105; G08G 73/1071; C08L 79/08
USPC ................................. 399/331; 428/458, 473.5
See application file for complete search history.

(56) References Cited

U.S. PATENT DOCUMENTS

| | | | |
|---|---|---|---|
| 6,505,029 B2 * | 1/2003 | Ishizaki et al. | 399/333 |
| 2002/0034621 A1 | 3/2002 | Shida | |
| 2002/0146259 A1 | 10/2002 | Zhou | |
| 2003/0038125 A1 | 2/2003 | Kataoka | |
| 2005/0084303 A1 | 4/2005 | Takagi | |
| 2005/0107526 A1 * | 5/2005 | Katou et al. | 524/606 |
| 2007/0147914 A1 | 6/2007 | Takahashi | |
| 2010/0279045 A1 * | 11/2010 | Nakajima et al. | 428/36.9 |

FOREIGN PATENT DOCUMENTS

| | | |
|---|---|---|
| JP | 08-080580 A | 3/1996 |
| JP | 2001-341231 A | 12/2001 |
| JP | 2002-258648 A | 9/2002 |
| JP | 2005-121825 A | 5/2005 |
| JP | 2005-215028 A | 8/2005 |
| JP | 3970122 B1 | 9/2007 |
| JP | 2009-156965 A | 7/2009 |
| WO | 2005-054960 A1 | 6/2005 |
| WO | WO 2009081630 A * | 7/2009 |

OTHER PUBLICATIONS

"Shinpan Koubunshi Bunseki Handbook" (New Edition Handbook of High Polymer Analysis), The Japan Society for Analytical Chemistry, published on Jan. 12, 1995, p. 1310, lines 1-18).

* cited by examiner

*Primary Examiner* — Callie Shosho
*Assistant Examiner* — John Freeman
(74) *Attorney, Agent, or Firm* — Canon U.S.A. Inc., IP Division

(57) ABSTRACT

A fixing belt includes a cylindrical base composed of a metal and a polyimide resin layer formed on the inner peripheral surface of the cylindrical base, in which the polyimide resin layer has an imidization rate of 70% to 93%, and comprises a polyimide resin containing a specific constitutional unit.

6 Claims, 1 Drawing Sheet

FIXING BELT AND FIXING DEVICE

TECHNICAL FIELD

The present invention relates to a fixing belt and a fixing device for use in an electrophotographic image-forming apparatus.

BACKGROUND ART

Patent Literature 1 discloses an invention relating to a laminated film including a metal layer and a polyimide resin layer, the laminated film being used for a fixing film for use in an image-heating apparatus for heat-fixing an unfixed image. Here, the polyimide resin layer is used to reduce the frictional resistance between the fixing film and a film-guiding member which is arranged on the backside of the fixing film and which is in contact with the back surface of the fixing film in a fixing device. Patent Literature 1 discloses that an imidization rate of the polyimide resin layer of 75% to 93% results in improvement in the flexibility of the polyimide resin layer, thereby relieving mechanical stress on the metal layer and improving the durability of the entire laminated film.

CITATION LIST

Patent Literature

PTL 1 Japanese Patent Laid-Open No. 2001-341231

The inventors have examined the laminated film according to Patent Literature 1 described above. The results demonstrated that the polyimide resin layer with an imidization rate of 70% to 93% has excellent flexibility and the excellent effect of relieving mechanical stress on the metal layer. However, in recent years, the demand for an electrophotographic image-forming apparatus with a higher process speed and higher durability has been increasing. Thus, the polyimide resin layer of the fixing belt which always slides on a pressure contact member such as a film guide is required to have higher abrasion resistance. The examination by the inventors showed that the abrasion resistance of the polyimide resin layer having an imidization rate of 70% to 93% according to Patent Literature 1 was not always sufficient to meet the demand for such further improvement in abrasion resistance.

So, the present invention is directed to obtaining a fixing belt including a polyimide resin layer having excellent flexibility and excellent abrasion resistance. Furthermore, the present invention is directed to obtaining a fixing device that maintains excellent fixing ability over the long term.

SUMMARY OF INVENTION

According to one aspect of the present invention, there is provided a fixing belt comprising a cylindrical base composed of a metal and a polyimide resin layer formed on the inner peripheral surface of the cylindrical base, wherein the polyimide resin layer has an imidization rate of 70% to 93%, and comprises a polyimide resin containing at least one selected from constitutional units represented by formulae (1) and (2), and at least one selected from constitutional units represented by formulae (3) and (4):

[Chem. 1]

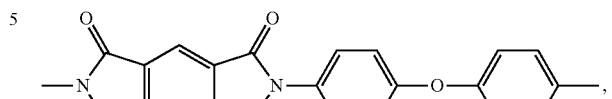

formula (1)

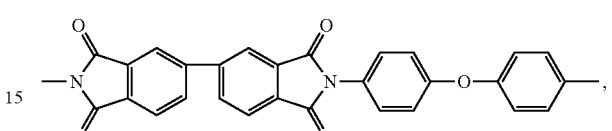

formula (2)

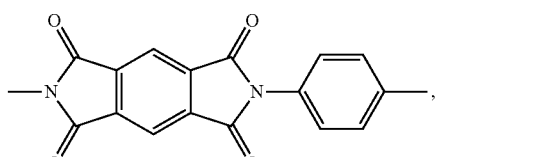

formula (3)

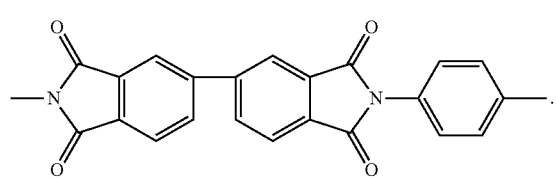

formula (4)

According to another aspect of the present invention, there is provided a fixing device comprising: the above described fixing belt, a pressure member arranged so as to face the fixing belt, and a member being in contact with the inner peripheral surface of the polyimide resin layer of the fixing belt and being configured to bring the fixing belt to pressure contact with the pressure member.

Further features of the present invention will become apparent from the following description of exemplary embodiments with reference to the attached drawings.

DESCRIPTION OF EMBODIMENTS

(1) Fixing Belt

Figure 1:
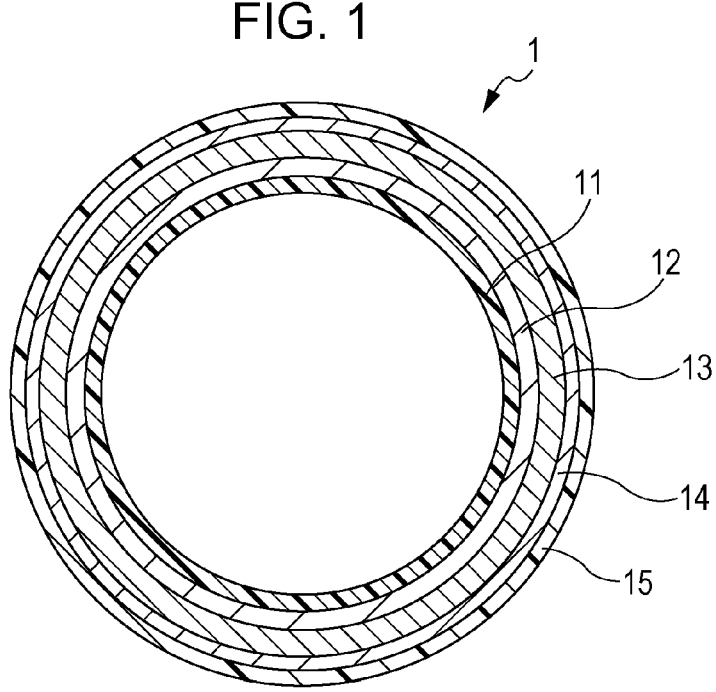
FIG. 1 is a sectional view of a fixing belt in the circumferential direction according to the present invention.

FIG. 1 is a sectional view of a fixing belt 1 in the circumferential direction according to the present invention. The fixing belt 1 includes a cylindrical base 12 composed of a metal and a polyimide resin layer 11 arranged on the inner peripheral surface thereof. An elastic layer 13 is arranged on the outer peripheral surface of the cylindrical base 12. Furthermore, a fluorocarbon resin layer 15 serving as a surface layer is bonded to the peripheral surface of the elastic layer 13 with an adhesive layer 14.

(2) Polyimide Resin Layer 11

The polyimide resin layer contains at least one selected from constitutional units represented by formulae (1) and (2) and at least one selected from constitutional units represented by formulae (3) and (4). In addition, the reaction rate of an imidization reaction (hereinafter, abbreviated as an "imidization rate") in the polyimide resin layer 11 is in the range of 70% to 93% and preferably 80% to 93%.

[Chem. 2]

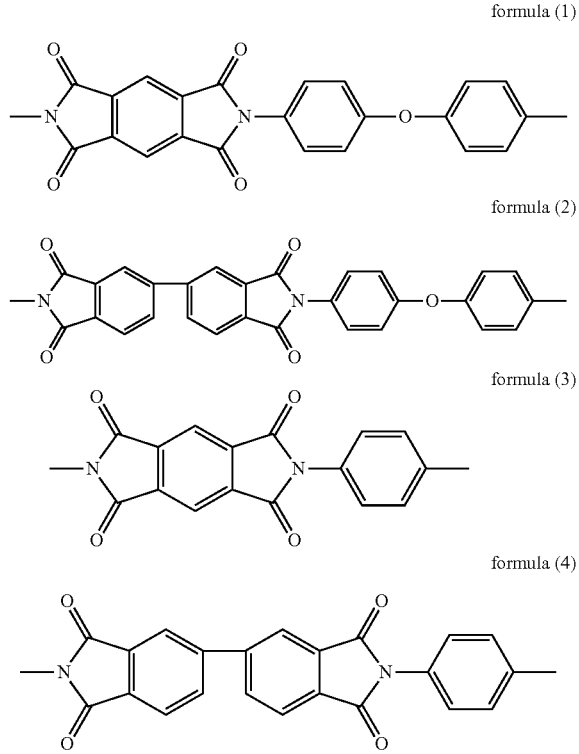

The term "imidization rate" means the reaction rate of an imidization reaction when a polyamic acid, which functions as a precursor of a polyimide, is thermally imidized by heating and baking to form a polyimide. Typically, it is known that the imidization rate of a polyimide film is determined by a comparison of the intensity of a peak at 1500 cm$^{-1}$ attributed to the skeletal vibration of benzene in an IR spectrum and the intensity of a peak at 1770 cm$^{-1}$ arising from a cyclic imide ("Shinpan Koubunshi Bunseki Handbook" (*New Edition Handbook of High Polymer Analysis*), The Japan Society for Analytical Chemistry, published on Jan. 12, 1995, p 1310, lines 1-18).

More specifically, measurement is made on a surface of a polyimide film, which is an object whose imidization rate will be determined, by an attenuated total reflection (ATR) method with a Fourier transform infrared spectrophotometer (FT-IR). The ratio of absorbance (a) at 1773 cm$^{-1}$ attributed to the C=O vibration of the imide ring to absorbance (b) at 1514 cm$^{-1}$ attributed to the skeletal vibration of the benzene ring is determined. In addition, a reference sample of a polyimide film is prepared by baking a coating film of a polyamic acid that is a raw material for the foregoing polyimide film at 400° C. for 30 minutes. The reference sample is defined as a reference theoretically having an imidization rate of 100%. The ratio (A/B) of absorbance (A) at 1773 cm$^{-1}$ attributed to the C=O vibration of the imide ring of the reference sample to absorbance (B) at 1514 cm$^{-1}$ attributed to the skeletal vibration of the benzene ring is determined. The imidization rate is then determined using calculation formula (1) below:

Imidization rate[%]=[(a/b)/(A/B)]×100.    Calculation formula (1)

Alternatively, (a) and (b) of a polyimide film, which is an object to be measured, are measured with the FT-IR. Next, the polyimide film is baked at 400° C. for 30 minutes. Similarly, measurement of the baked polyimide film is made with the FT-IR to determine absorbance (A) at 1773 cm$^{-1}$ attributed to the C=O vibration of the imide ring and absorbance (B) at 1514 cm$^{-1}$ attributed to the skeletal vibration of the benzene ring. The imidization rate is then determined using calculation formula (1) described above.

A polyimide resin layer having an imidization rate of 70% to 93% is more flexible than a polyimide resin layer having an imidization rate of substantially 100% and has an excellent capability of following the cylindrical base composed of a metal.

It is said that an aromatic polyimide represented by a structural formula described below has excellent mechanical properties because of the following two reasons:
The polyimide is rigid owing to aromatic groups R1 and R2 having a conjugated structure with an imide bond; and
the coplanar arrangement of the aromatic groups allows molecular chains to be densely packed, thus resulting in strong bonds between polymer chains owing to highly polar imide bonds,

[Chem. 3]

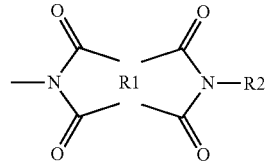

(wherein R1 and R2 in the structural formula each independently represent an aromatic group, for example, a phenyl group or a biphenyl group).

A polyimide resin having an imidization rate of 93% differs distinctly in flexibility from a polyimide resin having an imidization rate of 100%. This is probably attributed to the fact that the rigidity of the polymer chains is reduced because not all the conjugated structures are formed. Thus, in the case where the fixing belt required to have flexibility has a polyimide resin layer with an imidization rate of 93% or less, it is possible to sufficiently follow the bending of the metal base at a nip portion between a pressure member and the fixing belt. Meanwhile, the lower limits of the numerical range of the imidization rate of 70% and preferably 80% are values as a guide for achieving a sufficient amount of imide bonds needed to provide basic strength as a polyimide resin and have no critical meaning.

For a polyimide resin layer composed of a conventional aromatic polyimide resin, a reduction in imidization rate to a value within the numerical range described above results in satisfactory flexibility but causes a reduction in abrasion resistance. However, the inventors have found that a polyimide resin layer containing at least one selected from constitutional units represented by formulae (1) and (2) and at least one selected from constitutional units represented by formulae (3) and (4) makes it possible to suppress the reduction in the abrasion resistance even if the polyimide resin has an imidization rate 70% to 93%.

[Chem. 4]

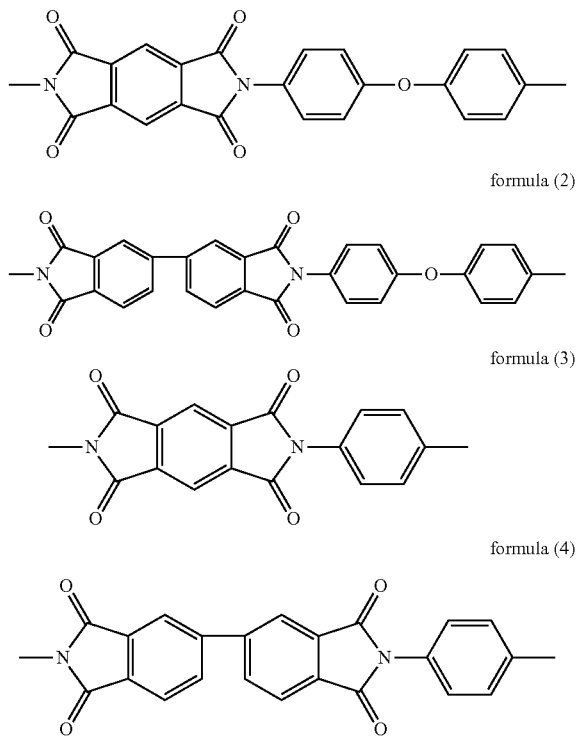

formula (1)

formula (2)

formula (3)

formula (4)

Descriptions will be specifically given. Samples of polyimide resin films having imidization rates of 97% and 93% were produced with a polyamic acid which had a structure represented by formula (5) and from which a polyimide resin containing the constitutional unit represented by formula (2) was prepared. In addition, samples of polyimide resin films having imidization rates of 97% and 93% were produced with a polyamic acid which had a structure represented by formula (6) and from which a polyimide resin containing the constitutional unit represented by formula (4) was prepared. Furthermore, samples of polyimide resin films having imidization rates of 97% and 93% were produced with polyamic acid mixtures containing the two types of polyamic acid in various mixing ratios. Each of the samples was formed on a surface of an electroformed nickel film in the same way as in Experimental A in EXAMPLES described below. Each of the polyimide resin films was 50 mm long, 50 mm wide, and 0.015 mm thick.

[Chem. 5]

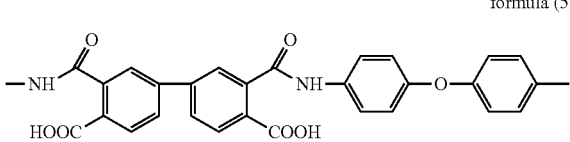

formula (5)

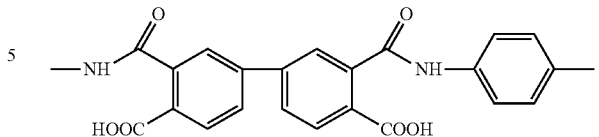

formula (6)

To evaluate the abrasion resistance of each of the samples, scratch resistance, which correlates with abrasion resistance, of the polyimide resin layer was measured. Measurement was made as described below. A linear reciprocal sliding tester (trade name: Friction Player FRP-2100, manufactured by Rhesca Corporation) was used. An alumina ball having a diameter of 3/16 inches was used as a contact. Then 300 reciprocations were performed at 200 mm/sec and a width of 30 mm with the contact pressed against each of the samples in an environment with a temperature of 200° C. After the reciprocations, the state of the ground surface was observed. The load was increased in increments of 50 g. The load when the polyimide resin film was ground through the entire thickness thereof was defined as the scratch resistance of the polyimide resin film.

Furthermore, a complex elastic modulus serving as an indicator of each of the samples was also evaluated by the following method in an environment with a temperature of 200° C. A film formed on a surface of an electroformed nickel film in the same way as in Experimental A in EXAMPLES described below and then removed from the electroformed nickel film was used as each of the samples. To facilitate the removal, the electroformed nickel film having a surface on which a release agent (trade name: XTEND W-4005, manufactured by Axel Plastics Research Laboratories, Inc.) had been applied in advance was used. Each of the samples was 30 mm long, 5 mm wide, and 0.015 mm thick. The complex elastic modulus was measured with a dynamic viscoelastometer (trade name: Rheogel-E4000HS, manufactured by UBM Co., Ltd). Measurement was made at a distance between chucks of 20 mm using a sinusoidal wave with a frequency of 10 Hz and an amplitude of 0.050 mm. Table 1 shows the scratch resistance the complex elastic modulus of each sample.

TABLE 1

| | | Number of moles of polyamic acid of formula (5)/number of moles of polyamic acid of formula (6) (molar ratio) | | | | |
|---|---|---|---|---|---|---|
| | | 0/100 | 40/60 | 50/50 | 60/40 | 100/0 |
| Imidization rate = 97% | Scratch resistance (g) | 2400 | 2350 | 2300 | 2200 | 2100 |
| | Complex elastic modulus (GPa) | 6.10 | 4.50 | 4.00 | 3.70 | 2.74 |
| Imidization rate = 93% | Scratch resistance (g) | 750 | 2100 | 2100 | 1800 | 1200 |
| | Complex elastic modulus (GPa) | 2.52 | 2.50 | 2.45 | 2.26 | 2.03 |

From Table 1, it was found that the polyimide resins having an imidization rate of 93% have higher flexibility than the polyimide resins having an imidization rate of 97% regardless of the ratios of the constitutional units represented by formulae (2) and (4). The results demonstrated that the softening of the polyimide resin layer by a reduction in imidization rate is a phenomenon that occurs similarly in different constitutional units and their ratios.

Meanwhile, with respect to scratch resistance, in absolute terms, the polyimide resins having an imidization rate of 97% are excellent compared with the polyimide resin having an imidization rate of 93%. The tendency of a change in scratch resistance due to a change in molar ratio differed completely between the cases of the imidization rates of 97% and 93%.

That is, the following was found: Regarding the polyimide resins having an imidization rate of 97%, the polyimide resin consisting of the constitutional unit represented by formula (4) exhibits the highest scratch resistance. The polyimide resin consisting of the constitutional unit represented by formula (2) has the lowest scratch resistance. The scratch resistance decreases as the proportion of the constitutional unit represented by formula (2) in the polyimide resin increases. It is speculated that the polyimide resin becomes soft as the proportion of the ether linkage in the polyimide resin increases because of a high degree of rotational freedom of the ether bond portion included in the constitutional unit represented by formula (2), so that the polyimide resin is easily ground.

Next, regarding the polyimide resins having an imidization rate of 93%, the polyimide resin consisting of the constitutional unit represented by formula (4) had a very low scratch resistance compared with the polyimide resin having an imidization rate of 97%. This indicates that the polyimide resin consisting of the constitutional unit represented by formula (4) provides excellent mechanical strength by the substantial completion of imidization. The polyimide resins consisting of the constitutional unit represented by formula (2) show a relatively small difference in scratch resistance between the cases of the imidization rates of 97% and 93%. Furthermore, the polyimide resins consisting of the constitutional unit represented by formula (2) have higher scratch resistance than the polyimide resin which consists of the constitutional unit represented by formula (4) and which has an imidization rate of 93%. These results suggest that in the case of the polyimide resins including the constitutional unit represented by formula (2) and having an imidization rate of 93%, a small amount of imide bonds, which strongly link the polymer chains to each other, is complemented with an ether linkage serving as a polar group. It is thus speculated that strong intermolecular bonds between the polymer chains are maintained to some extent, suppressing a reduction in scratch resistance even at low imidization rates. In addition, the coexistence of the constitutional unit represented by formula (4) and the constitutional unit represented by formula (2) probably results in an increase in the rigidity of the polymers in comparison with the polyimide resin layers consisting of the constitutional unit represented by formula (2). For the reasons described above, each of the polyimide resin layers which include the constitutional unit represented by formula (2) and the constitutional unit represented by formula (4) and which have an imidization rate of 70% to 93% is believed to have a good balance between flexibility and grinding resistance at a high level.

On the basis of the presumption described above, it is speculated that values of scratch resistance and complex elastic moduli of the following 10 types of polyimide resin samples have the same tendency as the results shown in Table 1:

Samples of polyimide resin films having imidization rates of 97% and 93% produced with a polyamic acid which had a structure represented by formula (7) and from which a polyimide resin containing the constitutional unit represented by formula (1) was prepared;

samples of polyimide resin films having imidization rates of 97% and 93% produced with a polyamic acid which had a structure represented by formula (8) and from which a polyimide resin containing the constitutional unit represented by formula (3) was prepared; and samples of polyimide resin films having imidization rates of 97% and 93% produced with polyamic acid mixtures containing the two types of polyamic acid in various mixing ratios.

[Chem. 6]

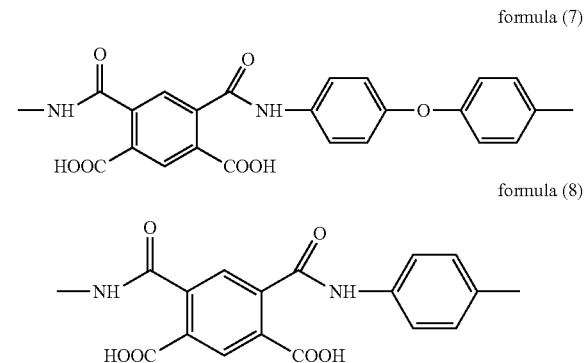

Ten types of samples were prepared with the polyamic acids represented by formulae (7) and (8) described above in the same way as above. The scratch resistance and complex elastic modulus of each of the samples were measured. The results shown in Table 2 demonstrated the same tendency as the data shown in Table 1.

TABLE 2

| | | Number of moles of polyamic acid of formula (7)/number of moles of polyamic acid of formula (8) (molar ratio) | | | | |
|---|---|---|---|---|---|---|
| | | 0/100 | 40/60 | 50/50 | 60/40 | 100/0 |
| Imidization rate = 97% | Scratch resistance (g) | 2300 | 2300 | 2250 | 2200 | 2150 |
| | Complex elastic modulus (GPa) | 5.00 | 4.50 | 4.17 | 3.95 | 3.57 |

TABLE 2-continued

| | | Number of moles of polyamic acid of formula (7)/number of moles of polyamic acid of formula (8) (molar ratio) | | | | |
|---|---|---|---|---|---|---|
| | | 0/100 | 40/60 | 50/50 | 60/40 | 100/0 |
| Imidization rate = 93% | Scratch resistance (g) | 500 | 2000 | 2000 | 1800 | 1200 |
| | Complex elastic modulus (GPa) | 2.49 | 2.40 | 2.30 | 2.26 | 1.98 |

In the polyimide resin layer, the molar ratio (total number of moles of formulae (1)+(2)/total number of moles of formulae (3)+(4)) of the constitutional units represented by formulae (1) and (2), which contain an ether linkage, to the constitutional units represented by formulae (3) and (4), which do not contain an ether linkage, is preferably in the range of 3/7 to 7/3 and particularly 5/5 to 6/4. This is because the ether linkage strengthens the intermolecular bonds between the polymer chains and because the presence of the ether linkage results in the prevention of the formation of an excessively soft polyimide resin.

Furthermore, the polyimide resin layer 11 may contain an inorganic filler in order to impart thermal conductivity thereto. Examples of the inorganic filler are described below: silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), molybdenum disulfide ($MoS_2$), graphite, titanium nitride (TiN), mica (mica), synthetic mica, and so forth.

(Formation of Polyimide Resin Layer)

The polyimide resin layer 11 may be formed through the following steps:

a step of preparing a polyimide precursor solution containing at least one polyimide precursor selected from formulae (5) and (7) and at least one polyimide precursor selected from formulae (6) and (8) in an appropriate molar ratio; and a step of forming a coating film of the solution on the back surface of the cylindrical base of a metal described below, drying the coating film, and heating the coating film to form imide bonds.

The constitutional unit represented by formula (1) may be obtained by the imidization of the polyamic acid represented by formula (7). The constitutional unit represented by formula (3) may be obtained by the imidization of the polyamic acid represented by formula (8). The constitutional unit represented by formula (2) may be obtained by the imidization of the polyamic acid represented by formula (5). The constitutional unit represented by formula (4) may be obtained by the imidization of the polyamic acid represented by formula (6).

Examples of a solvent that dissolves the polyamic acids described above include dimethylacetamide, dimethylformamide, N-methyl-2-pyrrolidone, phenol, and O-, M-, P-cresols.

(Control Method of Imidization Rate)

A method for controlling the imidization rate of a polyimide resin within a range of 70% to 93% will be described below. The imidization rate of polyimide resin may be adjusted by the baking temperature, the baking time, the type of polyamic acid, the presence or absence of a catalyst used, and the type of catalyst. Here, in general, the catalyst tends to accelerate an imidization reaction, sometimes causing difficulty in strictly controlling the imidization rate. Thus, in the present invention, preferably, the catalyst is preferably not used.

As a guide of the baking temperature and the baking time, the baking temperature is set in the range of 220° C. to 270° C., and the baking time is set in the range of 5 minutes to 60 minutes. A temperature of 220° C., which is defined as the lower limit of the baking temperature, is the substantial lowest temperature needed to allow the imidization reaction to proceed. A temperature of 270° C., which is defined as the upper limit of the baking temperature, is an approximate temperature needed to suppress the rapid progress of imidization.

With respect to the type of polyamic acid, a polyamic acid including an ether linkage has a high imidization reactivity compared with a polyamic acid that does not include an ether linkage because of electron-withdrawing properties of an ether linkage. That is, there is a tendency to increase the imidization rate even at a low temperature. Thus, a higher molar ratio of the polyamic acid including an ether linkage to the polyamic acid that does not include an ether linkage results in a polyimide resin layer having a high imidization rate when imidization is performed at the same baking temperature and the same baking time. In the case where polyimide resin layers having a thickness of 0.015 mm are produced on electroformed nickel films with polyimide resin precursors containing various polyamic acids, specific conditions needed to achieve a predetermined imidization rate will be described below. Note that all values of the imidization rates described here are based on values measured by an attenuated total reflection (ATR) method with a Fourier transform infrared spectrophotometer in an environment at a temperature of 25° C. and a humidity of 40%. Specifically, measurement was performed using a system of a Fourier transform infrared spectrophotometer (trade name: FT-IR 8900, manufactured by Shimadzu Corporation) combined with an infrared microscope (trade name: AIM-8800, manufactured by Shimadzu Corporation), a single reflection germanium prism, and an MCT detector. The measurement range is a mid-infrared region of 4000 $cm^{-1}$ to 800 $cm^{-1}$. Measurement was performed with an accumulation of 64 scans at a resolution of 4 $cm^{-1}$. The term "baking temperature" refers to a temperature in a baking furnace. The term "baking time" refers to the time from the charging of a sample placed at room temperature (25° C.) into the baking furnace in which a temperature in the furnace has reached a predetermined baking temperature to the removal of the baked sample from the baking furnace to place the sample in an environment at room temperature (25° C.).

(i) Conditions for adjusting imidization rate when a polyamic acid represented by formula (5) is allowed to react with a polyamic acid represented by formula (6) to produce a polyimide resin layer (with a thickness of 0.015 mm) composed of formulae (2) and (4) (without catalyst)

(i-1) Table 3-1 shows conditions for achieving an imidization rate of 93%.

TABLE 3-1

| | Molar ratio (2)/(4) | | | | | | |
|---|---|---|---|---|---|---|---|
| | 0/100 | 10/90 | 40/60 | 50/50 | 60/40 | 90/10 | 100/0 |
| Baking time (min) | 8 | 6 | 20 | 18 | 16 | 10 | 8 |
| Baking temperature (° C.) | 270 | 270 | 260 | 260 | 260 | 260 | 260 |

(i-2) Table 3-2 shows conditions for achieving an imidization rate of 80%.

TABLE 3-2

| | Molar ratio (2)/(4) | | | | | | |
|---|---|---|---|---|---|---|---|
| | 0/100 | 10/90 | 40/60 | 50/50 | 60/40 | 90/10 | 100/0 |
| Baking time (min) | 14 | 13 | 7 | 22 | 20 | 15 | 14 |
| Baking temperature (° C.) | 250 | 250 | 250 | 240 | 240 | 240 | 240 |

(i-3) Table 3-1 shows conditions for achieving an imidization rate of 70%.

TABLE 3-3

| | Molar ratio (2)/(4) | | | | | | |
|---|---|---|---|---|---|---|---|
| | 0/100 | 10/90 | 40/60 | 50/50 | 60/40 | 90/10 | 100/0 |
| Baking time (min) | 10 | 8 | 18 | 17 | 15 | 11 | 9 |
| Baking temperature (° C.) | 240 | 240 | 230 | 230 | 230 | 230 | 230 |

(ii) Conditions for adjusting imidization rate when polyimide resin layer composed of constitutional unit represented by formula (1) and constitutional unit represented by formula (3) is produced (without catalyst)

(ii-1) Table 4-1 shows conditions for achieving an imidization rate of 93%.

TABLE 4-1

| | Molar ratio (1)/(3) | | | | |
|---|---|---|---|---|---|
| | 10/90 | 40/60 | 50/50 | 60/40 | 90/10 |
| Baking time (min) | 21 | 15 | 13 | 11 | 23 |
| Baking temperature (° C.) | 260 | 260 | 260 | 260 | 250 |

(ii-2) Table 4-2 shows conditions for achieving an imidization rate of 80%.

TABLE 4-2

| | Molar ratio (1)/(3) | | | | |
|---|---|---|---|---|---|
| | 10/90 | 40/60 | 50/50 | 60/40 | 90/10 |
| Baking time (min) | 24 | 19 | 31 | 41 | 37 |
| Baking temperature (° C.) | 240 | 240 | 230 | 220 | 220 |

(ii-3) Table 4-3 shows conditions for achieving an imidization rate of 70%.

TABLE 4-3

| | Molar ratio (1)/(3) | | | | |
|---|---|---|---|---|---|
| | 10/90 | 40/60 | 50/50 | 60/40 | 90/10 |
| Baking time (min) | 19 | 14 | 26 | 24 | 20 |
| Baking temperature (° C.) | 230 | 230 | 220 | 220 | 220 |

(iii) Conditions for adjusting imidization rate when polyimide resin layer composed of constitutional unit represented by formula (2) and constitutional unit represented by formula (3) is produced (without catalyst)

(iii-1) Table 5-1 shows conditions for achieving an imidization rate of 93%.

TABLE 5-1

| | Molar ratio (2)/(3) | | | | |
|---|---|---|---|---|---|
| | 10/90 | 40/60 | 50/50 | 60/40 | 90/10 |
| Baking time (min) | 22 | 16 | 14 | 29 | 24 |
| Baking temperature (° C.) | 260 | 260 | 260 | 250 | 250 |

(iii-2) Table 5-2 shows conditions for achieving an imidization rate of 80%.

TABLE 5-2

| | Molar ratio (2)/(3) | | | | |
|---|---|---|---|---|---|
| | 10/90 | 40/60 | 50/50 | 60/40 | 90/10 |
| Baking time (min) | 25 | 20 | 32 | 17 | 12 |
| Baking temperature (° C.) | 240 | 240 | 230 | 240 | 240 |

(iii-3) Table 5-3 shows conditions for achieving an imidization rate of 70%.

TABLE 5-3

| | Molar ratio (2)/(3) | | | | |
|---|---|---|---|---|---|
| | 10/90 | 40/60 | 50/50 | 60/40 | 90/10 |
| Baking time (min) | 20 | 15 | 27 | 25 | 21 |
| Baking temperature (° C.) | 230 | 230 | 220 | 220 | 220 |

(iv) Conditions for adjusting imidization rate when polyimide resin layer composed of constitutional unit represented by formula (1) and constitutional unit represented by formula (4) is produced (without catalyst)

(iv-1) Table 6-1 shows conditions for achieving an imidization rate of 93%.

TABLE 6-1

| | Molar ratio (1)/(4) | | | | |
|---|---|---|---|---|---|
| | 10/90 | 40/60 | 50/50 | 60/40 | 90/10 |
| Baking time (min) | 53 | 48 | 46 | 56 | 52 |
| Baking temperature (° C.) | 240 | 240 | 240 | 230 | 230 |

(iv-2) Table 6-2 shows conditions for achieving an imidization rate of 80%.

TABLE 6-2

| | Molar ratio (1)/(4) | | | | |
|---|---|---|---|---|---|
| | 10/90 | 40/60 | 50/50 | 60/40 | 90/10 |
| Baking time (min) | 40 | 35 | 21 | 19 | 14 |
| Baking temperature (° C.) | 230 | 230 | 240 | 240 | 240 |

(iv-3) Table 6-3 shows conditions for achieving an imidization rate of 70%.

TABLE 6-3

| | Molar ratio (1)/(4) | | | | |
|---|---|---|---|---|---|
| | 10/90 | 40/60 | 50/50 | 60/40 | 90/10 |
| Baking time (min) | 22 | 17 | 16 | 14 | 10 |
| Baking temperature (° C.) | 230 | 230 | 230 | 230 | 230 |

(Coating Method)

Examples of a method for applying the polyimide precursor solution onto the inner surface of the cylindrical base include a dipping method and a coating method using a ring coating head, which are known.

(2) Cylindrical Base 12

Examples of the cylindrical base composed of a metal include a cylindrical nickel base formed by electroforming; and a cylindrical base formed by plastic working of a stainless steel sheet into a belt shape.

As the electroformed cylindrical nickel base, an electroformed cylindrical nickel base according to an invention described in Japanese Patent Laid-Open No. 2002-258648, WO05/054960, or Japanese Patent Laid-Open No. 2005-121825 may be used. As the cylindrical base formed by working a stainless steel sheet, a cylindrical base according to an invention described in Japanese Patent No. 3970122 may be used.

(3) Elastic Layer 13

The elastic layer is arranged in order not to excessively crushing toner during fixing. As a material for the elastic layer, a cured article of addition curable silicone rubber is preferably used. This is because the elasticity may be appropriately adjusted by adjusting the degree of crosslinking in response to the type and amount of filler added, the filler being described below.

(3-1) Addition Curable Silicone Rubber

In general, addition curable silicone rubber contains an organopolysiloxane having an unsaturated aliphatic group, an organopolysiloxane having active hydrogen bonded to silicon, and a platinum compound serving as a crosslinking catalyst. The organopolysiloxane having active hydrogen bonded to silicon reacts with the alkenyl group of the organopolysiloxane component having an unsaturated aliphatic group to form a crosslinked structure by the catalysis of the platinum compound.

The elastic layer 13 may contain a filler in order to control the thermal conductivity, improve the mechanical strength, and improve the heat resistance of the elastic layer. To improve the thermal conductivity, in particular, a filler having a high thermal conductivity is preferred. Specific examples thereof include inorganic substances, in particular, metals and metallic compounds. Specific examples of the filler having a high thermal conductivity include silicon carbide (SiC), silicon nitride ($Si_3N_4$), boron nitride (BN), aluminum nitride (AlN), alumina ($Al_2O_3$), zinc oxide (ZnO), magnesium oxide (MgO), silica ($SiO_2$), copper (Cu), aluminum (Al), silver (Ag), iron (Fe), and nickel (Ni). These may be used alone or as a mixture of two or more thereof. The average particle size of the filler having a high thermal conductivity is preferably in the range of 1 μm to 50 μm from the viewpoint of handling and dispersibility. Regarding the shape of the filler, a spherical shape, a crushed shape, an acicular shape, a plate-like shape, a whisker-like shape, or the like may be used. From the viewpoint of dispersibility, a spherical-shaped filler is preferred.

In light of the contribution to the surface hardness of the fixing belt and the efficiency of heat conduction to unfixed toner during fixing, the elastic layer preferably has a thickness of 100 μm to 500 μm and particularly 200 μm to 400 μm. The elastic layer 13 may be formed by applying an addition curable silicone rubber composition containing the addition curable silicon rubber and the filler on the peripheral surface of the cylindrical base 12 using a ring-shaped coating head and then performing heating for a predetermined time to cause crosslinking. At this time, the heating temperature is preferably 200° C. or lower. This is because at a heating temperature of 200° C. or lower, the imidization rate of the polyimide resin layer is not changed so long as a catalyst or the like is not used.

(4) Fluorocarbon Resin Layer 15

To form the fluorocarbon resin layer, for example, a tube-shaped article composed of a resin exemplified below is used.

Examples of the resin include tetrafluoroethylene-perfluoro(alkyl vinyl ether) copolymers (PFAs), polytetrafluoroethylene (PTFE), and tetrafluoroethylene-hexafluoropropylene copolymers (FEPs).

Among the materials exemplified above, PFA is preferred from the viewpoint of formability and toner releasability. The fluorocarbon resin layer preferably has a thickness of 50 μm or less. This is because it is possible to maintain the elasticity of the silicone rubber layer, which serves as an underlying layer, and to suppress an excessive increase in the surface hardness of the fixing member when lamination is performed. The inner surface of the fluorocarbon resin tube may be subjected to sodium treatment, excimer laser treatment, ammonia treatment, or the like in advance to improve the adhesion.

(4-1) Formation of Fluorocarbon Resin Layer

An addition curable silicone rubber adhesive is applied on the upper surface of the elastic layer 13 described above. This outer surface is covered with the fluorocarbon resin tube to perform lamination. A covering method is not particularly limited. Examples of the covering method that may be employed include a method in which covering is performed with the addition type silicone rubber adhesive used as a lubricant; and a method in which the fluorocarbon resin tube is expanded from the outside to perform covering. An excess amount of the addition curable silicone rubber adhesive left between the cured silicone rubber layer and the fluorocarbon resin layer is squeezed and removed using means (not shown). The thickness of the squeezed adhesive layer is preferably 20 μm or less. The silicone rubber adhesive used for fixing the fluorocarbon resin tube to the elastic layer 13 is composed of the cured material of the addition curable silicone rubber adhesive applied to the surface of the silicone rubber elastic layer 13. The addition curable silicone rubber adhesive contains an addition curable silicone rubber compounded with a self-adhesive component such as silane having a functional group, e.g., an acryloxy group, a hydrosilyl group (SiH group), an epoxy group, or an alkoxysilyl group. Then the addition curable silicone rubber adhesive is cured by heating for a predetermined time using heating means such as an electric furnace, thereby affording the adhesive layer 14. Next, the fixing belt is obtained by cutting both end portions by a desired length. Preferably, the heating temperature at which the addition curable silicone rubber adhesive is cured is also set to 200° C. or lower. This is because the imidization rate of the polyimide resin layer is not affected.

(5) Fixing Device

Figure 2:
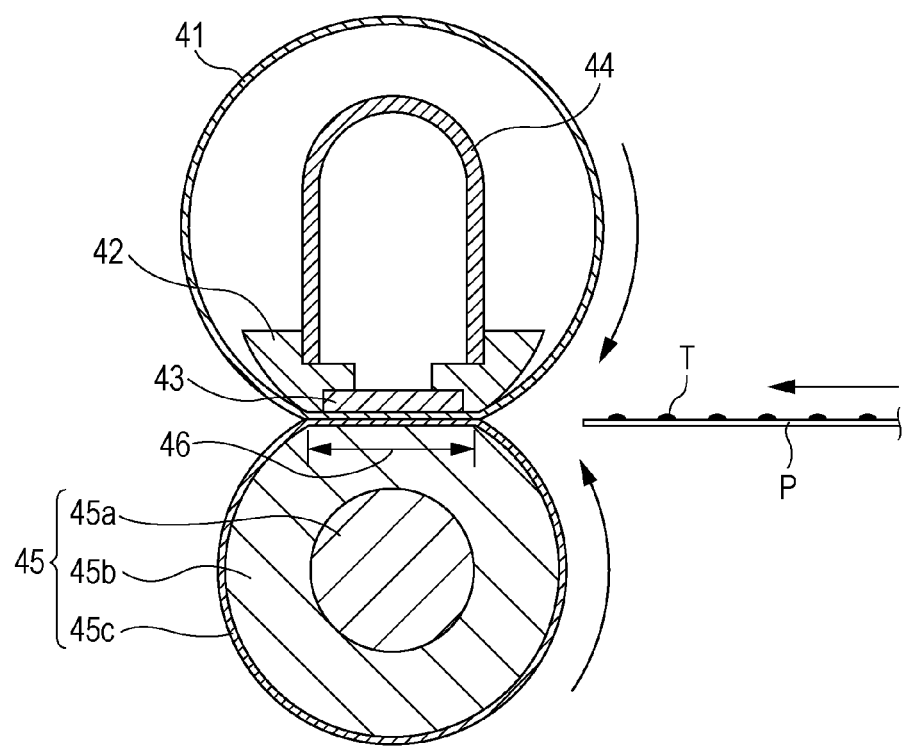
FIG. 2 is a cross-sectional view of a heat-fixing device according to the present invention.

FIG. 2 illustrates a cross-sectional view of a fixing device 40 according to the present invention. In this fixing device, a seamless fixing belt 41 is loosely fit the outside of a belt guide member 42. A rigid pressing stay 44 is inserted in the belt guide member 42. A ceramic heater 43 is arranged at a position where the belt guide member 42 is in contact with the inner surface of the fixing belt 41. With respect to the ceramic heater 43, a conductive paste containing a silver-palladium alloy is applied on an aluminum nitride substrate (not shown) by screen printing so as to form a film having a uniform thickness, thereby forming a resistance heating element. Then the resistance heating element is fitted in a groove portion (not shown) formed in the belt guide member 42 in the longitudinal direction and is thus fixed to the belt guide member 42. The ceramic heater 43 is energized by means (not shown) to cause heating and is capable of being controlled to a constant temperature.

A pressure roller 45 functioning as a pressure member arranged so as to face the fixing belt 41 includes a mandrel 45a, an elastic layer 45b covering the peripheral surface of the mandrel 45a, and a surface layer 45c covering the peripheral surface of the elastic layer. The elastic layer 45b is composed of, for example, silicone rubber. The surface layer 45c is composed of, for example, a fluorocarbon resin in order to improve the releasability of toner.

Pressure springs (not shown) are fitted, in a state of compression, at both end portions of the rigid pressing stay 44. They press the rigid pressing stay 44 downward. Furthermore, the ceramic heater 43 arranged on the under surface of the belt guide member 42 brings the fixing belt 41 into pressure contact with the pressure roller 45. Thus, the ceramic heater 43 slides while being in contact with the inner peripheral surface of the polyimide resin layer 11 of the fixing belt 41. The mandrel 45a of the pressure roller 45 is coupled to a driving unit (not shown). The rotation of the pressure roller 45 drives the fixing belt 41. The fixing device 40 holds a recording material P supporting unfixed toner T at a fixing nip portion 46 constituted by the fixing belt 41 and the pressure roller 45 and heats the unfixed toner under pressure, thereby fixing the toner on the recording material.

EXAMPLES

Experiment A

Preparation of Various Polyimide Resin Layers and Measurement of Physical Properties (1) Production of Electroformed Nickel Film A nickel-iron alloy plating bath containing nickel sulfate (130 g/l), ferrous sulfate (3.1 g/l), boric acid (25 g/l), sodium chloride (23 g/l), saccharin sodium (0.07 g/l), and sodium lauryl sulfate (0.02 g/l) was prepared. A mother die made of stainless steel, which served as a negative electrode, was immersed in the plating bath. The nickel-iron alloy was subjected to electrodeposition at a bath temperature of 40° C. and a current density of 2 A/dm$^2$ for 120 minutes. The deposited nickel-iron alloy thin film was removed from a mother die, thereby affording an electroformed nickel film.

(2) Two polyamic acid solutions described below were mixed to prepare three types of polyimide resin precursor solutions in such a manner that polyimide resins to be obtained had molar ratios of the constitutional unit represented by formula (2) to the constitutional unit represented by formula (4) of 9:1, 5:5, and 1:9.

An N-methyl-2-pyrrolidone solution of polyamic acid represented by formula (5) (a polyimide precursor composed of 3,3',4,4'-biphenyltetracarboxylic acid dianhydride and 4,4'-diamino diphenyl ether) (trade name: U-Varnish A, manufactured by Ube Industries, Ltd).

Polyamic acid represented by formula (6) (a polyimide precursor composed of 3,3',4,4'-biphenyltetracarboxylic acid dianhydride and p-phenylenediamine) (trade name: U-Varnish S, manufactured by Ube Industries, Ltd).

(3) Coating films of the three types of polyimide resin precursor solutions were formed on the electroformed nickel film that had been formed in item (1) by a slit coating method. These coating films were dried in an environment at a temperature of 200° C. for 10 minutes. Then the coating films were baked at temperatures for periods of time as shown in Table 3-2, affording three types of polyimide resin films each being 50 mm long, 50 mm wide, and 0.015 mm thick and having an imidization rate of 80%.

(4) As comparison subjects, a coating film composed of "U-Varnish A" alone and a coating film composed of "U-Varnish S" alone were similarly formed on the surface of the electroformed nickel film and baked at temperatures for periods of time as shown in Table 3-2, affording two types of polyimide resin films each having an imidization rate of 80%.

(5) Five types of polyimide resin films each having an imidization rate of 70% were produced as in items (1) and (2), except that regarding the baking conditions, the temperatures and the periods of time were changed as shown in Table 3-3.

(6) The scratch resistance and the complex elastic modulus of each of a total of 10 types of polyimide resin films produced in items (2) to (5) were measured by the foregoing methods. Table 7 shows the results.

TABLE 7

| | | Number of moles of polyamic acid of formula (5)/number of moles of polyamic acid of formula (6) (molar ratio) | | | | |
|---|---|---|---|---|---|---|
| | | 0/100 | 10/90 | 50/50 | 90/10 | 100/0 |
| Imidization rate = 80% | Scratch resistance (g) | 700 | 1500 | 2000 | 1400 | 1100 |
| | Complex elastic modulus (GPa) | 2.28 | 2.20 | 2.05 | 1.91 | 1.90 |
| Imidization rate = 70% | Scratch resistance (g) | 650 | 1300 | 1450 | 1300 | 950 |
| | Complex elastic modulus (GPa) | 2.11 | 2.03 | 1.79 | 1.70 | 1.68 |

Experiment B

Evaluation Experiment as Fixing Belt

Production of Endless Metal Belt (Cylindrical Base) Composed of Electroformed Nickel Film A nickel-iron alloy plating bath containing nickel sulfate (130 g/l), ferrous sulfate (3.1 g/l), boric acid (25 g/l), sodium chloride (23 g/l), saccharin sodium (0.07 g/l), and sodium lauryl sulfate (0.02 g/l) was prepared. A cylindrical-shaped mother die made of stainless steel, which served as a negative electrode, was immersed in the plating bath. The nickel-iron alloy was subjected to electrodeposition at a bath temperature of 40° C. and a current density of 2 A/dm$^2$ for 120 minutes. The deposited nickel-iron alloy thin film was removed from the mother die, thereby producing a belt-like base having an inner diameter of 30 mm, a thickness of 40 µm, and a length of 420 mm.

Example 1

The three types of polyimide precursor solutions prepared in item (2) of Experiment A were applied on the inner peripheral surface of each of the three belt-like bases produced in Experiment B by a ring coating method and dried in an environment at a temperature of 200° C. for 10 minutes. Then the cylindrical bases were baked at temperatures for periods of time as shown in Table 3-1, thereby forming polyimide resin layers each having a thickness of 10 µm and an imidization rate of 93%.

Furthermore, addition curable silicone rubber (trade name: DY35-561A/B, manufactured by Dow Corning Toray Co., Ltd.) was applied on the peripheral surface of each of the bases and cured by heating at 200° C. for 5 minutes, thereby forming a 300-µm-thick elastic layer. An addition curable silicone rubber adhesive was applied so as to form a film having a thickness of 5 µm on the peripheral surface of the elastic layer, covered with a PFA tube having a thickness of 30 µm, and cured by heating at 200° C. for 5 minutes, thereby producing three fixing belts.

We ascertained that the imidization rate of each of the polyimide resin layers is not changed even after the polyimide resin layers are subjected to heating during the formation of the elastic layers and during the curing of the addition curable adhesive. This is because the heating temperature during the formation of the elastic layers and the curing temperature of the addition curable silicone rubber adhesive are set to 200° C., at which the imidization reaction does not proceed.

Comparative Example 1

Two fixing belts each including a polyimide resin layer having an imidization rate of 93% were produced as in item (2), except that a coating film composed of "U-Varnish A" alone and a coating film composed of "U-Varnish S" alone were formed on the inner peripheral surfaces of the bases and baked at temperatures for periods of time as shown in Table 3-1.

Example 2

Three fixing belts each including a polyimide resin layer having an imidization rate of 80% were produced as in Example 1, except that in Example 1, the baking was performed at temperatures for periods of time as shown in Table 3-2.

Comparative Example 2

A fixing belt including a polyimide resin layer having an imidization rate of 80% was produced as in Comparative Example 1, except that in Comparative Example 1, the baking was performed at temperatures for periods of time as shown in Table 3-2.

Example 3

Three fixing belts each including a polyimide resin layer having an imidization rate of 70% were produced as in Example 1, except that in Example 1, the baking was performed at temperatures for periods of time as shown in Table 3-3.

Comparative Example 3

Two fixing belts each including a polyimide resin layer having an imidization rate of 70% were produced as in Comparative Example 1, except that in Comparative Example 1, the baking was performed at temperatures for periods of time as shown in Table 3-3.

Comparative Example 4

Three fixing belts each including a polyimide resin layer having an imidization rate of 97% as in Example 1, except that in Example 1, the baking temperature was set to 300° C. and the baking time was set to 30 minutes.

The heat-fixing device illustrated in FIG. 2 was fitted with each of 17 fixing belts produced in Examples 1 to 3 and Comparative Examples 1 to 4. The durability was evaluated by a method described below. Here, the pressure roller 45 includes the elastic layer 3 mm in thickness composed of silicone rubber arranged on the peripheral surface of the mandrel 25 mm in diameter composed of stainless steel; and a 30-µm-thick PFA tube covering the elastic layer. The pressure (force applied by the pressure springs) applied between the fixing belt 41 and the pressure roller 45 was set to 300 N. The nip portion 46 had a width of 8 mm and a length of 310 mm. Furthermore, 1.5 g of a lubricant (trade name: HP300, manufactured by Dow Corning Corporation) was applied to the surface of the ceramic heater 43. With the ceramic heater 43 set at 200° C., the idle operation of the fixing device was performed 600 hours by rotating the pressure roller 45 in such a manner that the surface velocity of the fixing belt was 210 mm/s. Then load torque for the pressure roller 45 that is required to maintain the rotation needed to maintain the surface velocity of the fixing belt 41 at 210 mm/s was monitored. Here, if the polyimide resin layer of the fixing belt wears out because of the friction with the ceramic heater 43, the resulting abrasion powder accumulates in the nip portion, thereby increasing the friction between the fixing belt 41 and the ceramic heater 43. This increases the load torque for the pressure roller 45. Thus, by monitoring the load torque for the pressure roller 45, the load torque can be used as an indicator of the level of wear of the fixing belt 41. The initial load torque and the load torque after 600 hours elapsed time are shown in Tables 8-1 to 8-4.

TABLE 8-1

|  | Molar ratio | Initial torque (N/m) | Torque after 600 hours of rotation (N/m) |
|---|---|---|---|
| Fixing belt of Example 1 | 10/90 | 0.53 | 0.60 |
|  | 50/50 | 0.53 | 0.59 |
|  | 90/10 | 0.54 | 0.69 |
| Fixing belt of Comparative Example 1 | 0/10 | 0.53 | 0.96 |
|  | 10/0 | 0.54 | 0.79 |

TABLE 8-2

|  | Molar ratio | Initial torque (N/m) | Torque after 600 hours of rotation (N/m) |
|---|---|---|---|
| Fixing belt of Example 2 | 10/90 | 0.55 | 0.69 |
|  | 50/50 | 0.56 | 0.63 |
|  | 90/10 | 0.56 | 0.71 |
| Fixing belt of Comparative Example 2 | 0/10 | 0.55 | 1.01 |
|  | 10/0 | 0.56 | 0.86 |

TABLE 8-3

|  | Molar ratio | Initial torque (N/m) | Torque after 600 hours of rotation (N/m) |
|---|---|---|---|
| Fixing belt of Example 3 | 10/90 | 0.57 | 0.74 |
|  | 50/50 | 0.58 | 0.73 |
|  | 90/10 | 0.58 | 0.74 |
| Fixing belt of Comparative Example 3 | 0/10 | 0.57 | 1.07 |
|  | 10/0 | 0.58 | 0.82 |

TABLE 8-4

|  | Molar ratio | Initial torque (N/m) | Torque after 600 hours of rotation (N/m) |
|---|---|---|---|
| Fixing belt of Comparative Example 4 | 10/90 | 0.50 | Occurrence of cracking of base at 530 H |
|  | 50/50 | 0.51 | Occurrence of cracking of base at 550 H |
|  | 90/10 | 0.52 | Occurrence of cracking of base at 600 H |

As is clear from Tables 8-1 to 8-4, in the fixing belts according to the present invention, the rate of change in load torque for the pressure roller is extremely low compared with the fixing belts according to Comparative Examples. This enables us to understand that the excellent flexibility and high abrasion resistance of the fixing belt according to the present invention have the excellent effect on the fixing device.

Experiment C: Confirmation of Imidization Rate (1) Infrared absorption spectra of surfaces of polyimide resin layers of nine fixing belts produced in the same ways as in Examples 1 to 3 were measured. Measurement was performed using a system of a Fourier transform infrared spectrophotometer (trade name: FT-IR 8900, manufactured by Shimadzu Corporation) combined with an infrared microscope (trade name: AIM-8800, manufactured by Shimadzu Corporation), a single reflection germanium prism, and an MCT detector. The measurement range is a mid-infrared region of 4000 $cm^{-1}$ to 800 $cm^{-1}$. Measurement was performed with an accumulation of 64 scans at a resolution of 4 $cm^{-1}$. Table 9-1 shows absorbance (a) at 1773 $cm^{-1}$ attributed to the C=O vibration of the imide ring and absorbance (b) at 1514 $cm^{-1}$ attributed to the skeletal vibration of the benzene ring of each of the fixing belts. Then the fixing belts were baked at 400° C. for 30 minutes. Absorbance (A) at 1773 $cm^{-1}$ attributed to the C=O vibration of the imide ring and absorbance (B) at 1514 $cm^{-1}$ attributed to the skeletal vibration of the benzene ring of each of the baked fixing belts were measured. The imidization rate is then determined using calculation formula (1) described above. Tables 9-1 to 9-3 show the results. The results demonstrate that the heating steps of forming the elastic layers and the adhesive layers did not affect the imidization rate of the polyimide resin layers.

TABLE 9-1

|  | Molar ratio | a | b | a/b | A | B | A/B | Imidization rate (%) |
|---|---|---|---|---|---|---|---|---|
| Example 1 | 10/90 | 0.222 | 0.406 | 0.547 | 0.251 | 0.427 | 0.588 | 93 |
|  | 50/50 | 0.203 | 0.486 | 0.418 | 0.230 | 0.512 | 0.449 | 93 |
|  | 90/10 | 0.185 | 0.567 | 0.326 | 0.209 | 0.597 | 0.350 | 93 |

TABLE 9-2

|  | Molar ratio | a | b | a/b | A | B | A/B | Imidization rate (%) |
|---|---|---|---|---|---|---|---|---|
| Example 2 | 10/90 | 0.187 | 0.396 | 0.472 | 0.252 | 0.426 | 0.592 | 80 |
|  | 50/50 | 0.171 | 0.475 | 0.360 | 0.231 | 0.511 | 0.452 | 80 |
|  | 90/10 | 0.156 | 0.554 | 0.282 | 0.209 | 0.596 | 0.351 | 80 |

TABLE 9-3

|  | Molar ratio | a | b | a/b | A | B | A/B | Imidization rate (%) |
|---|---|---|---|---|---|---|---|---|
| Example 3 | 10/90 | 0.159 | 0.382 | 0.416 | 0.252 | 0.424 | 0.594 | 70 |
|  | 50/50 | 0.145 | 0.459 | 0.316 | 0.231 | 0.510 | 0.453 | 70 |
|  | 90/10 | 0.132 | 0.535 | 0.247 | 0.210 | 0.595 | 0.353 | 70 |

According to the present invention, it is possible to obtain a fixing belt including a polyimide resin layer having excellent flexibility and high abrasion resistance. Furthermore, according to the present invention, it is possible to obtain a fixing device having excellent durability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/063512, filed Jul. 29, 2009, which is hereby incorporated by reference herein in its entirety.

REFERENCE SIGNS LIST 1 fixing belt
12 cylindrical base
11 polyimide resin layer
13 elastic layer
14 adhesive layer
15 fluorocarbon resin layer

The invention claimed is:

1. A fixing belt comprising a cylindrical base composed of a metal and a polyimide resin layer formed on the inner peripheral surface of the cylindrical base,
wherein the polyimide resin layer has an imidization rate of 70% to 93%, and
comprises a polyimide resin containing a constitutional unit represented by formula (1) and a constitutional unit represented by formula (3), or
a polyimide resin containing a constitutional unit represented by formula
(2) and a constitutional unit represented by formula (4):

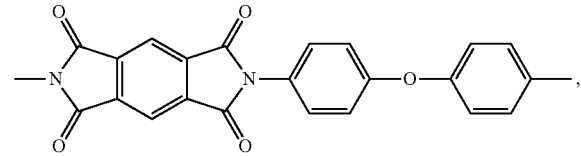

formula (1)

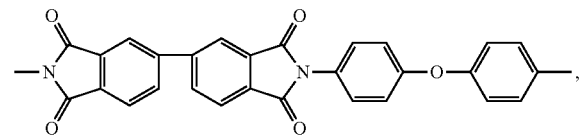

formula (2)

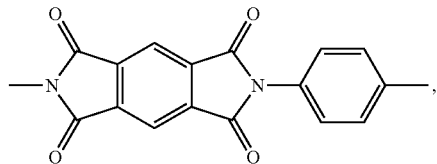

formula (3)

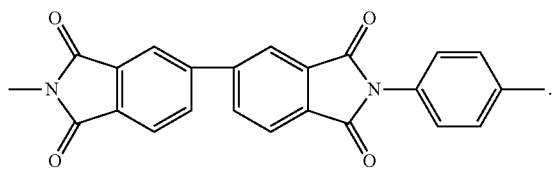

formula (4)

wherein a molar ratio of the constitutional units represented by formula (1) to the constitutional units represented by formula (3), or the constitutional units represented by formula (2) to the constitutional units represented by formula (4) is from 4/6 to 6/4.

2. A fixing device comprising:

the fixing belt according to claim 1;

a pressure member arranged so as to face the fixing belt; and a member being in contact with the inner peripheral surface of the polyimide resin layer of the fixing belt and being configured to bring the fixing belt to pressure contact with the pressure member.

3. The fixing belt according to claim 1, wherein said polyimide resin layer comprises the polyimide resin containing the constitutional units represented by said formulae (1) and (3).

4. The fixing belt according to claim 1, wherein said polyimide resin layer comprises the polyimide resin containing the constitutional units represented by said formulae (2) and (4).

5. The fixing belt according to claim 1, wherein said polyimide resin layer has an imidization rate of 80% to 93%.

6. The fixing belt according to claim 1, further comprising an elastic layer on a peripheral surface of said cylindrical base, and a fluorocarbon resin layer as a surface layer bonded to a peripheral surface of said elastic layer.

* * * * *